July 5, 1955 F. W. YOUNG 2,712,387
ROTARY FILTER WITH PULSATING BLOWBACK MEANS
Filed Oct. 19, 1950 2 Sheets-Sheet 1

INVENTOR
FRANK W. YOUNG
BY Martin Kirkpatrick
ATTORNEY

July 5, 1955  F. W. YOUNG  2,712,387
ROTARY FILTER WITH PULSATING BLOWBACK MEANS
Filed Oct. 19, 1950  2 Sheets-Sheet 2

INVENTOR
FRANK W. YOUNG
BY
Martin Kirkpatrick
ATTORNEY

United States Patent Office 2,712,387
Patented July 5, 1955

2,712,387

ROTARY FILTER WITH PULSATING BLOWBACK MEANS

Frank W. Young, Medfield, Mass.

Application October 19, 1950, Serial No. 190,994

2 Claims. (Cl. 210—199)

This invention relates to continuous vacuum filters of the rotary drum type, and more particularly to a novel apparatus for discharging the filter cake formed on such filters.

Continuous rotary drum filters of the type to which this invention relates commonly have a horizontally mounted, generally cylindrical filter drum partially immersed in the slurry to be filtered. The outer surface of the filter drum is covered by a filter medium, such as cloth, and at least a portion of the interior of the drum is connected to a source of suction, such as a vacuum pump, so that as the drum is rotated through the slurry and the filtrate passes through the filter cloth, a filter cake is formed on the outer surface of the filter cloth. As the filter drum continues to rotate, the newly deposited filter cake passes out of the slurry and begins to dry, since it is still subjected to suction which draws air through the filter cake. If desired, the filter cake may also be washed by passing water or other washing agent through it.

The dried and washed filter cake has commonly been discharged or stripped from the filter cloth by applying a positive fluid pressure, usually air pressure, to a small segment of the inner surface of the filter drum on the descending side thereof to blow the filter cake off the filter cloth. A doctor blade was usually provided to assist in the removal of the cake.

Though the positive air pressure, or "blow back" served to remove a relatively thick and well compacted filter cake in a satisfactory manner, in the case of thin filter cakes, particularly those in which the particle size was relatively small, the "blow back" merely blew holes in the filter cake, removing but a small part of the filter cake and leaving the major portion thereof on the filter cloth. The filter cake thus left on the filter cloth passed back into the slurry and remained on the filter cloth, reducing the amount of new filter cake which could be picked up on the filter cloth.

Thus, particularly in the case of thin filter cakes having relatively small particle size and a dense, closely woven filter media, the discharge of the filter cake was relatively inefficient and in many cases, with particular types of slurry, was so inefficient as to render the filter substantially useless for filtering such slurries.

I have found that even thin filter cakes of small particle size may be discharged from the filter cloth of a rotary drum filter by applying a rapidly pulsating air pressure discharge to the filter cake, so that filter cloth supporting the filter cake is alternately subjected to pressure and suction for extremely short intervals of time. Such pulsations appear to first blow out the filter cloth with the filter cake, then suck the cloth back and pull it away from the cake, the momentum of which cake carries it out away from the filter.

It is a feature of the invention that by its use filter cakes of types formerly considered most difficult to discharge may be cleanly discharged, resulting in a greatly increased efficiency of the filter and, indeed, making possible for the first time the filtering of many slurries by rotary drum filters.

It is a further feature of the invention that, due to its simplicity, it may be incorporated in existing rotary drum filter units with very little change or reconstruction, thus old filter units may be changed to incorporate the invention to enable them to produce filter cakes which could not previously be produced efficiently on such filters.

For the purpose of explaining further features and advantages of the invention, reference is made to the following drawings illustrating a preferred embodiment thereof, in which.

Figure 1:
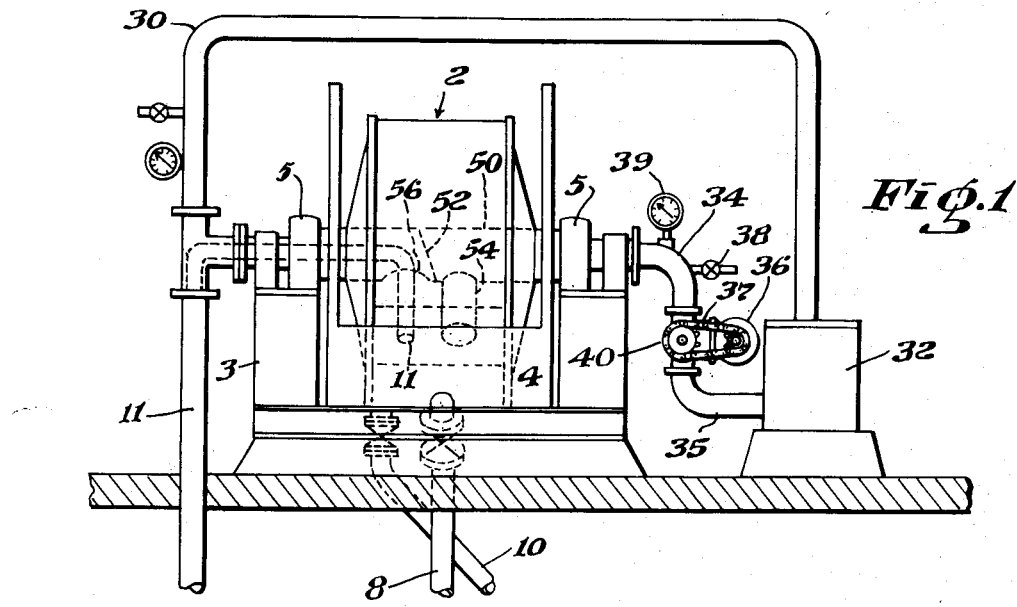
Fig. 1 is a diagrammatic view of a rotary drum filter embodying the invention.
Figure 2:
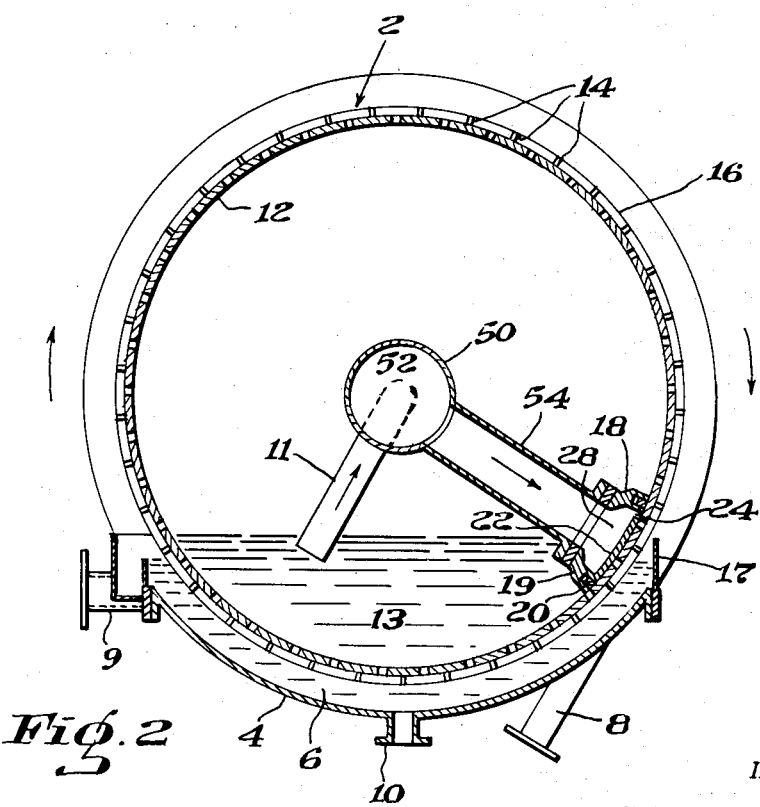
Fig. 2 is a cross-sectional view of the filter drum as used in the practice of the invention.

Referring to Figs. 1 and 2, the continuous rotary drum filter of the invention includes a cylindrical filter element generally designated at 2, made up of a drum 12 covered with suitable filter media 16, mounted in suitable bearings 5 on frame 3 of the apparatus for rotation about a horizontal axis above a filter tank 4 so that the filter element 2 will be partially immersed in the slurry 6 to be filtered. The filter tank 4 is provided with a suitable pipe 8 for supplying slurry from a supply tank (not shown), and a pipe 9 for returning the overflow of filter tank 4 to the supply tank. A syphon pipe 11 is provided extending inside filter element 2 to remove the filtrate 13 from the drum, said pipe 11 being provided with a suitable pump, not shown. A drain pipe 10 may be provided in the bottom of filter tank 4.

The filter element 2 includes a perforated drum 12 having longitudinally extending filter cloth support elements 14 on its outer surface between the rows of the perforations. A filter cloth 16 or other suitable filter medium is attached to the outer edges of the support elements 14, said filter cloth 16 forming substantially the entire outer surface of the filter element 2. A longitudinally extending baffle 17 forming a wall of tank 4 is provided outside the filter element 2 on the descending side thereof to prevent discharged filter cake from falling into the slurry 6 in tank 4.

The interior of the filter drum 12 is provided with an axial pipe 50 said pipe 50 being fixed with relation to frame 3 of the apparatus so that drum 12 may be rotated around said pipe. A baffle plate 52 is provided midway in said pipe to divide said pipe into two sections, one of said sections being connected to a suitable source of suction and the other of said sections being connected to a source of blow back pressure as hereinafter more fully explained.

The section of said pipe which is connected to a source of blow back pressure (the right-hand section in Fig. 1) has a pipe 54 extending radially therefrom toward the interior surface of drum 12 at the lower descending side thereof, the outer end of said pipe 54 being provided with a pair of rotationally fixed longitudinally extending members 18 and 19 forming a chamber 28 adjacent the interior peripheral surface of drum 12. Pressure seal elements 20 are provided at the edges of said members 18 and 19 adjacent the interior peripheral surface of drum 12 to reduce communication of air pressure between chamber 28 and the remaining portion of the interior of drum 12, though communication of air pressure should not be entirely prevented, as hereinafter more fully explained. A plate 22 is provided closely adjacent the interior surface of drum 12 and concentric therewith, said plate 22 extending from member 19 towards member 18 and forming a narrow slot 24 between said plate and member 18.

The major portion of the interior of drum 12 is connected to the suction portion of pipe 50 (the lefthand end in Fig. 1) by an opening 56 in said pipe, said opening also being utilized by syphon pipe 11 which extends downwardly through said opening into the filtrate 13 in the interior of the drum 12.

The section comprising the major portion of the interior of drum 12 is supplied through pipes 30 and 50 with suitable suction by a vacuum pump 32, while the chamber 28 is provided with rapidly pulsating air pressure, through the right-hand portion of pipe 50, as hereinafter more fully explained. The inner surface of the drum 12, by means of members 18 and 19 together with the plate 22, is divided into three segments, a filtering and drying segment extending from member 19 clockwise as shown in Fig. 2 to member 18, a discharge segment adjacent slot 24 on the descending side of the drum 12 just above the baffle 17 of the tank 4, and an inactive segment adjacent plate 22 to prevent filtering action until the surface of the discharged filter cloth 16 is below the surface of the slurry 6, though of course more or less segments may be employed as desired, as is well understood in the art.

In accordance with the invention, the chamber 28 is provided with a rapidly pulsating air pressure through pipes 34, 50 and 54, the positive portion of said pulsating air pressure being provided by our novel rotating valve, generally designated at 40, connected by pipe 35 to any suitable source of air pressure, such as the exhaust of vacuum pump 32. The valve 40 is preferably placed in the pressure line, made up of pipes 34 and 35, close to the filter element 2 so that pipe 34 between said valve and said filter element will be as short as possible. A motor 36 is provided to rotate valve 40 through chain drive 37. An adjustable vent 38 is preferably placed in pipe 34 to permit adjustment of the pulsating air pressure, and, if desired, a pressure indicator 39 may be placed in said line.

Figure 3:
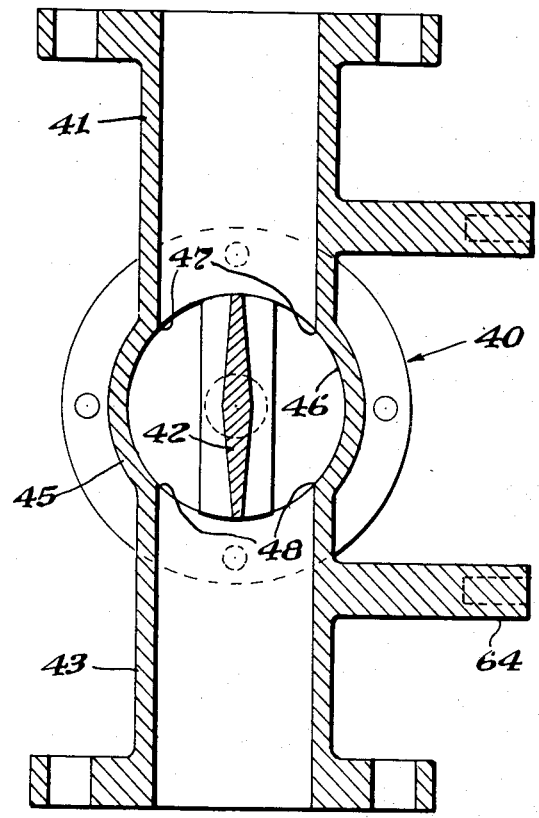
Fig. 3 is a cross-sectional plan view of a means for producing a pulsating air pressure as used in the practice of the invention.
Figure 4:
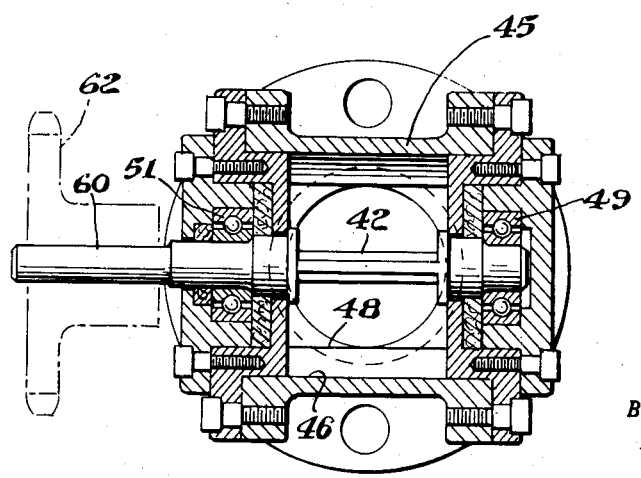
Fig. 4 is a cross-sectional elevational view of the pulsating air pressure means of Fig. 3.

Referring to Figs. 3 and 4, the valve 40 includes a body portion 45 having a cylindrical chamber 46 therein. Portions of the opposite sides of the body portion are cut away forming openings 47 and 48 through the opposite circumferential walls of said body portion 45 into chamber 46. Pipes 41 and 43 are attached to the outer surface of said body portion 45 at openings 47 and 48, respectively, the axes of said pipes preferably being aligned and at right angles to the axis of the cylindrical chamber 46. The outer ends of said pipes 41 and 43 may be provided with suitable flanges.

A vane 42 is mounted to rotate about the axis of cylindrical cavity 46 within said cavity, suitable bearings 49 and 51 being provided in the opposite end walls of said cavity. A shaft 60 upon which is mounted a sprocket 62 is provided to enable the vane 42 to be rotated by motor 36 through chain drive 37. Motor mounts 64 may be provided on said valve if desired.

The vane 42 is of a size adapted to fit and be rotated within said cylindrical chamber 46, the length of said vane being substantially equal to the length of said cylindrical cavity, and the width of said vane being substantially equal to the diameter of said interior cavity, less suitable rotational clearances, while the thickness of said vane is kept as small as possible.

Since the valve 40 should have an open period substantially equal to its closed period when rotated at substantially constant rotational speed, the openings 47 and 48 are each arranged to extend for a circumferential distance substantially less than one-half of the interior circumferential distance around cavity 46, and I prefer that said openings 47 and 48 extend for about one-fourth of said distance, thus dividing the interior surface of said cavity into four substantially equal segments, the two openings 47 and 48 forming two of said segments, and the interior wall of said cavity between said openings forming the other two of said segments.

When a source of positive air pressure is provided at one of said pipes 41 and 43 and vane 42 is rotated by motor 36, the rotating vane 42 will operate to alternately open and close valve 40 to produce relatively abrupt pulses of positive air pressure at the output side of said valve, said positive pressure pulses produced by valve 40 being separated by a time interval about equal to about the same time interval as that of the duration of a pulse. Vane 42 will thus prevent communication of pressure between pipes 41 and 43 for one-fourth of a revolution by closing the valve, then will open said valve for the next fourth of a revolution, thus producing at each complete revolution of vane 42 two positive pulses separated by a period of time equal to the duration of said pulses, and turning off and on said pressure for about equal intervals of time.

In operation, I prefer that the vane 42 be rotated at least about 500 revolutions per minute, that is, at the rate of at least about 1000 pulses per minute and within such range at about 1000 to 2000 pulses per minute. Under such conditions, the pulsating air discharge pressure as applied to a section of the under side of the filter cake between the filter cloth supports 14 through slot 24 and the perforations in drum 12 first by a positive pressure pulse blows the filter cloth 16 outward with the filter cake on it. At the end of the positive pulse, the leak around the pressure seals 20 in the filter creates a negative pressure in chamber 28 due to the suction in the remaining portion of the filter drum 12. The negative pressure pulse thus created in chamber 28 following the positive pulse rapidly sucks the filter cloth back toward the drum 12, but the momentum of the outwardly moving filter cake carries the cake away and permits the filter cloth to come back clean as substantially the entire filter cake will have been stripped from the filter cloth by the rapidly alternating positive and negative pulses.

Though I have herein referred to air as the pulsating discharge medium, it will be understood that I intend to include gases other than air, such as may be desirable with certain types of filter cake.

Thus it will be seen that I have provided a novel discharge means for continuous rotary drum filters which permits greatly increased efficiency of discharge of such filters. It will be understood by those skilled in the art that I have merely illustrated a preferred embodiment of the invention, and that various modifications and changes therein may be made nevertheless within the spirit of our invention and the scope of the appended claims.

I claim:

1. In a continuous rotary drum filter for separating solids from a suspension of solids in liquid, the combination which comprises a tank for the suspension, outlet means communicating with said tank for limiting said suspension to a predetermined liquid level, a filter drum, a filtering medium carried on the surface of said drum for the formation of a cake of said solids, bearings rotatably supporting said drum so that said medium passes through said tank, means communicating with the interior of said drum to apply suction to the inner side of said filter medium to draw liquid and gas therethrough over a major portion of its area, a conduit extending axially into said drum and adapted to be connected to an external source of positive gas pressure, said conduit having a rotationally stationary extension within said drum extending radially outwardly towards its interior surface on the descending side thereof, members attached to said extension forming a stationary chamber communicating with said extension and having a longitudinally extending opening adjacent an area of said interior surface at a level above but close to that of said outlet means, the walls of said chamber which define said opening being in sealing engagement with the drum interior surface and substantially sealing both said chamber and the corresponding portion of said interior surface from said suction, and a valve in said conduit for periodically interrupting the flow of said gas, said valve comprising a body portion having a cylindrical cavity and diametrically opposed gas inlet and outlet openings and a vane mounted for rotation coaxially within said cavity, each of said openings extending substantially less than one-half of the interior circumferential distance around said cavity, whereby said valve, upon rotation of said vane, will produce abrupt pulses in said flow of gas to dislodge said cake, such pulses and the intervals therebetween being of approximately equal duration, the wall of said tank on the descending side of said drum forming a longitudinally extending baffle to divert the dislodged filter cake away from said suspension externally of said tank.

2. In a continuous rotary drum filter for separating solids from a suspension of solids in liquid, the combination which comprises a tank for the suspension, a filter drum, a filtering medium carried on the surface of said drum for the formation of a cake of said solids, bearings rotatably supporting said drum so that said medium passes through said tank, means communicating with the interior of said drum to apply suction to the inner side of said filter medium to draw liquid and gas therethrough over a major portion of its area, a conduit extending into said drum and adapted to be connected to an external source of positive gas pressure, said conduit having a rotationally stationary extension within said drum extending outwardly toward the interior surface of said drum on the descending side thereof, members attached to said extension forming a stationary chamber communicating with said extension and having a longitudinally extending opening adjacent a predetermined area of said interior surface, the walls of said chamber which define said opening being in sealing engagement with the drum interior surface and substantially sealing both said chamber and the corresponding portion of said interior surface from said suction, and a valve in said conduit for periodically interrupting the flow of said gas, said valve comprising a body portion having a cylindrical cavity and diametrically opposed gas inlet and outlet openings and a vane mounted for rotation coaxially within said cavity, each of said openings extending substantially less than one-half of the interior circumferential distance around said cavity, whereby said valve, upon rotation of said vane, will produce abrupt pulses in said flow of gas to dislodge said cake, such pulses and the intervals therebetween being of approximately equal duration, the wall of said tank on the descending side of said drum forming a longitudinally extending baffle to divert the dislodged filter cake away from said suspension and externally of said tank.

References Cited in the file of this patent

UNITED STATES PATENTS

| | | |
|---|---|---|
| 984,718 | Taylor | Feb. 21, 1911 |
| 1,214,152 | Genter | Jan. 30, 1917 |
| 1,627,882 | Berry | May 10, 1927 |
| 1,791,251 | Shimin | Feb. 3, 1931 |
| 1,796,491 | Sweetland | Mar. 17, 1931 |
| 2,197,610 | Fedeler | Apr. 16, 1940 |
| 2,285,649 | Evans | June 9, 1942 |
| 2,352,303 | Young | June 27, 1944 |
| 2,352,304 | Young | June 27, 1944 |
| 2,435,235 | Porter | Feb. 3, 1948 |
| 2,508,396 | Jordan | May 23, 1950 |
| 2,525,135 | Huff | Oct. 10, 1950 |

FOREIGN PATENTS

| | | |
|---|---|---|
| 207,290 | Switzerland | Jan. 16, 1940 |